July 22, 1930.  L. G. DE KERMOR  1,770,913
LIQUID FUEL SUPPLY CONTROL MEANS FOR BURNERS
Filed Aug. 18, 1927  3 Sheets-Sheet 2
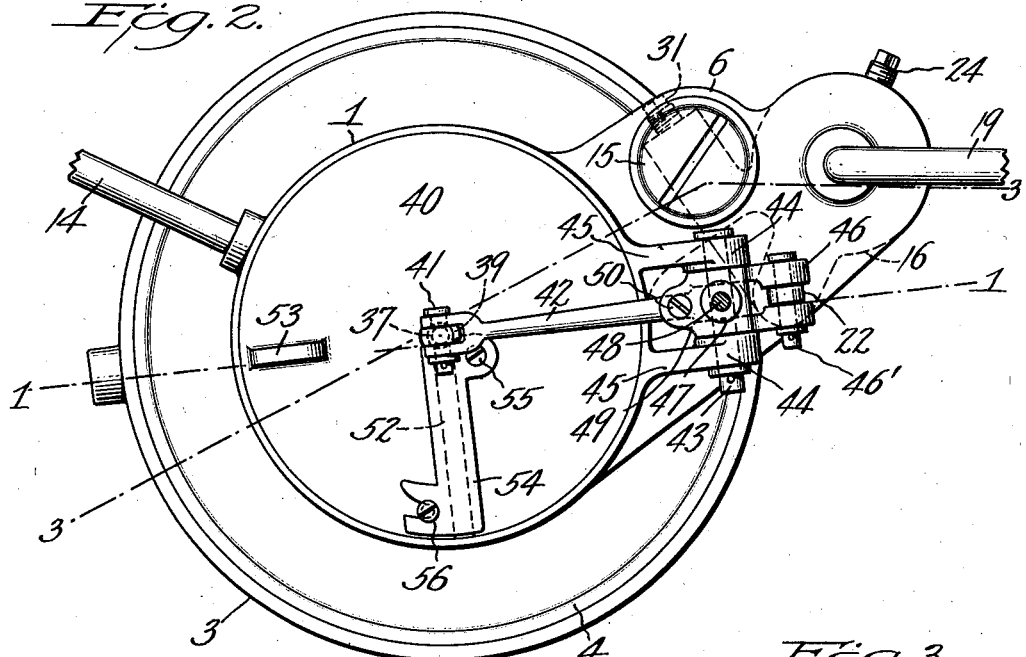
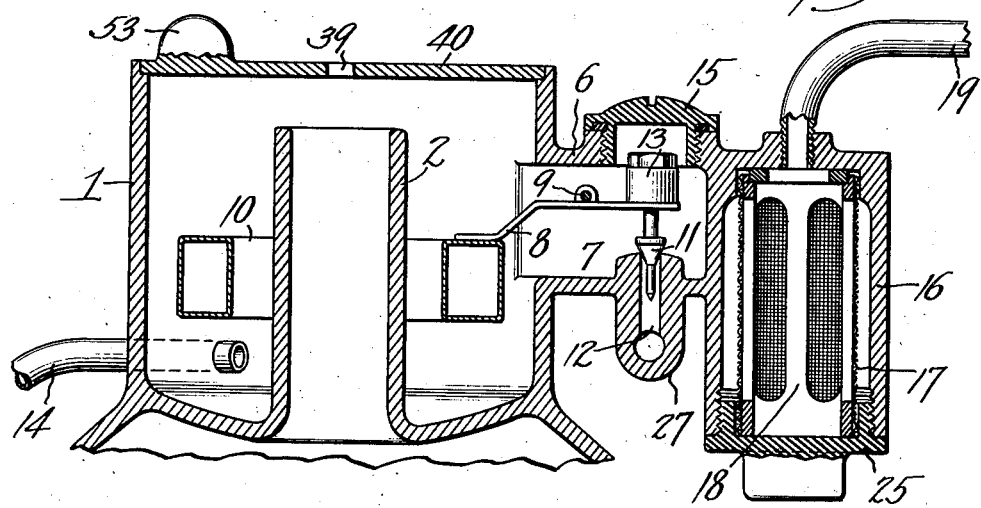
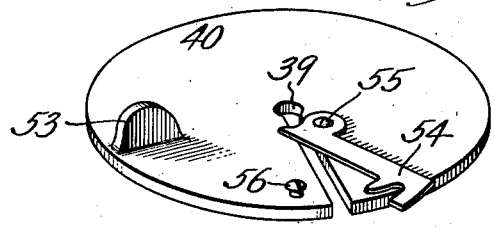
INVENTOR
Louis G. de Kermor
BY
Frederick W. Barker
ATTORNEY July 22, 1930.  L. G. DE KERMOR  1,770,913
LIQUID FUEL SUPPLY CONTROL MEANS FOR BURNERS
Filed Aug. 18, 1927  3 Sheets-Sheet 3
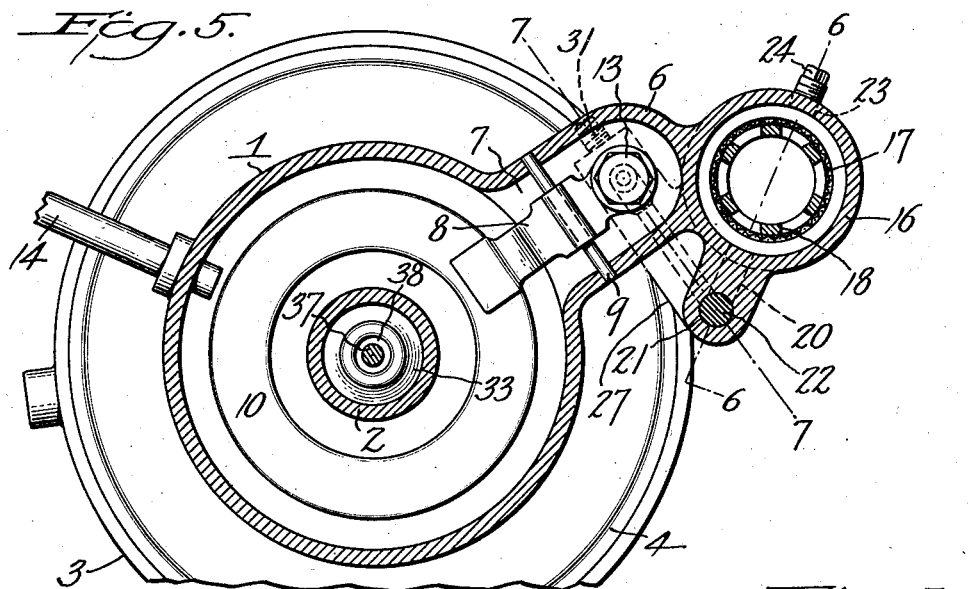
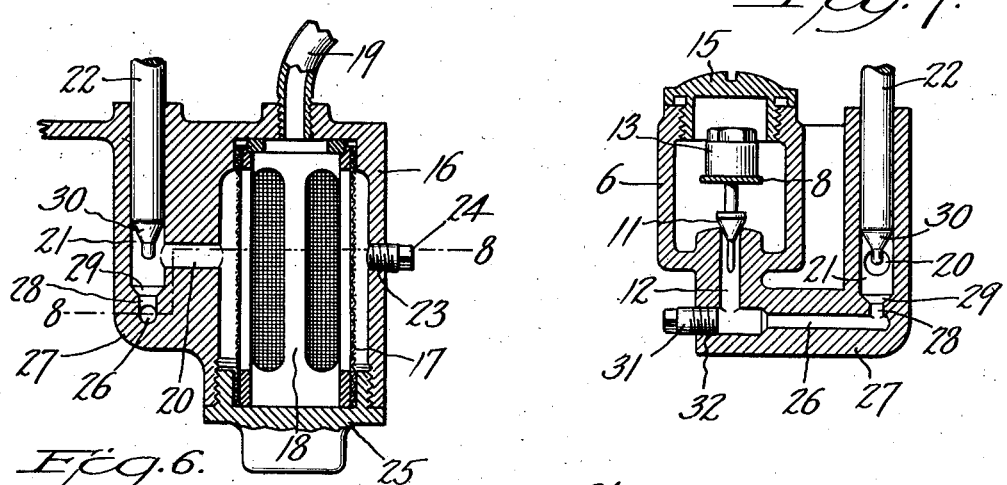
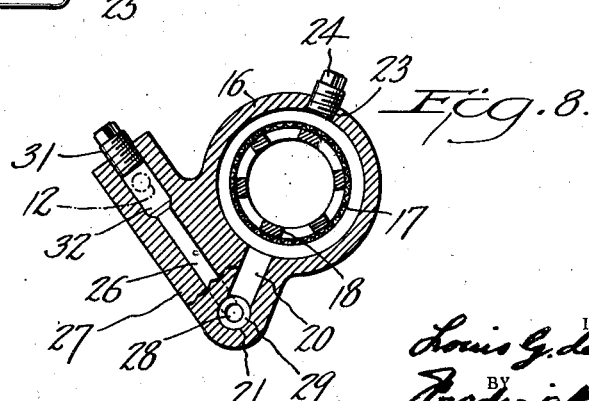
INVENTOR
Louis G. de Kermor
BY
Frederick S. Barker
ATTORNEY Patented July 22, 1930

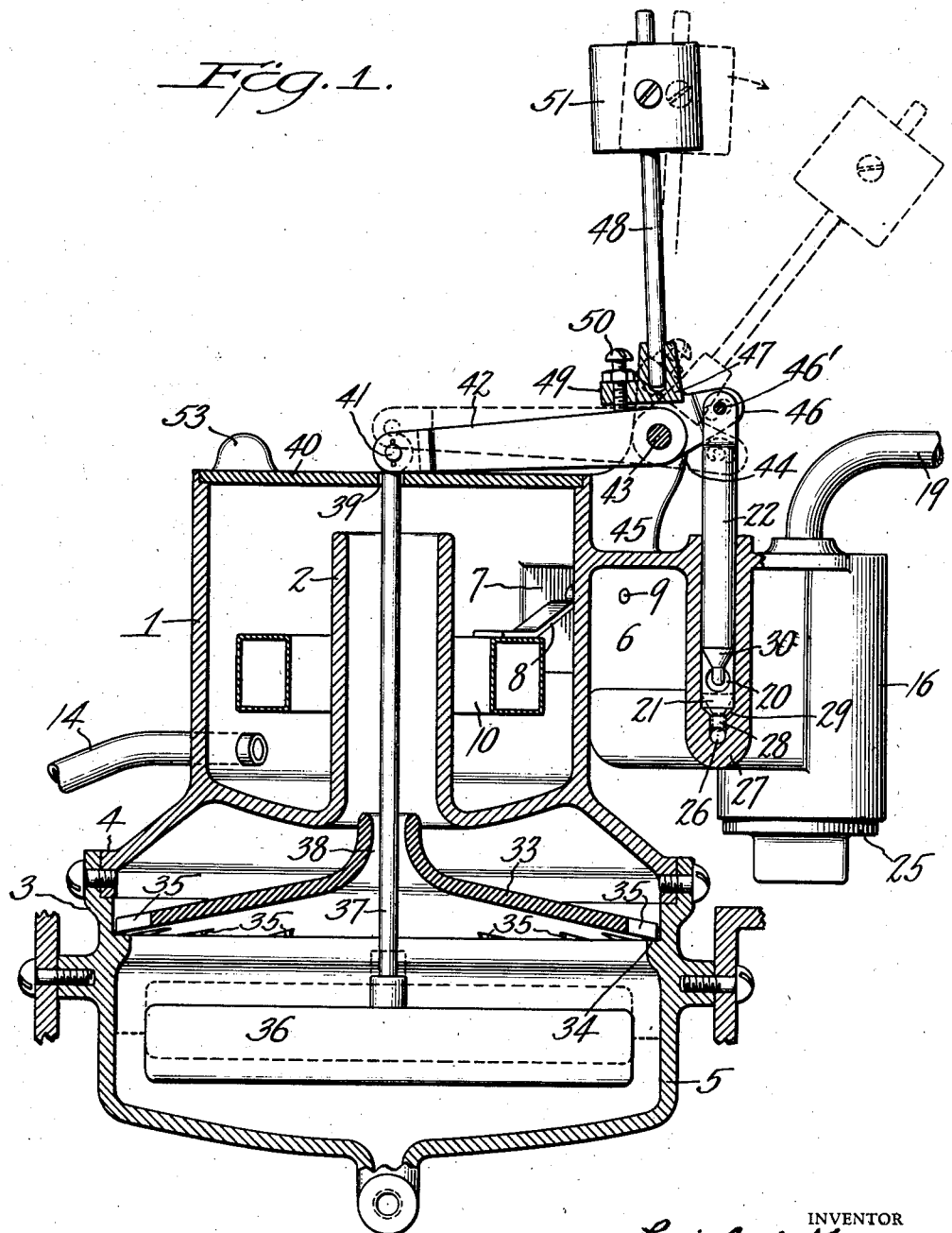

1,770,913

UNITED STATES PATENT OFFICE

LOUIS G. DE KERMOR, OF EDMONTON, ALBERTA, CANADA, ASSIGNOR TO DELWAY HEATERS, INC., OF NEW YORK, N. Y., A CORPORATION OF NEW YORK

LIQUID-FUEL-SUPPLY CONTROL MEANS FOR BURNERS

Application filed August 18, 1927. Serial No. 213,722.

This invention relates to means employed in conjunction with a float controlled supply of fuel for oil burners wherein the oil supply becomes automatically shut-off in the event of the oil continuing to flow after the flame is extinguished or through failure to turn off the supply.

I am aware that automatic cut-off devices for use with oil burners are well known in the art, but the particular merit pertaining to the present improvement lies first in the mechanical efficiency of the float feed control, and secondly in that said improvement provides a double safeguard wherein a predetermined quantity of escaping oil is collected and operates to elevate an auxiliary float for the purpose of tripping a weight whose resulting fall effects the positive closing of the oil supply.

Other features and advantages of my invention will hereinafter appear.

In the drawings:

Figure 1 is a sectional elevation of an apparatus embodying my invention on line 1—1 of Fig. 2.

Fig. 2 is a top plan view thereof.

Fig. 3 is an enlarged partial view in section of the float feed chamber and oil supply means therefor on line 3—3 of Fig. 2.

Fig. 4 is a perspective view of the cover for the float feed chamber.

Fig. 5 is a horizontal sectional view of the apparatus.

Fig. 6 is a section on the line 6—6 of Fig. 5.

Fig. 7 is a section on the line 7—7 of Fig 5, and

Fig. 8 is a section on the line 8—8 of Fig. 6.

In said views let 1 indicate the bowl of a float chamber, having an open ended tube 2 vertically extended therein from its base to a point near the upper end of said bowl, and let 3 indicate an annular skirt depending from the base 4 of the bowl, said skirt being secured to and thereby forming the upper portion of a receptacle 5.

The bowl 1 is provided with a lateral offset 6, which defines a space or passage 7 that is in communication with the bowl interior. An arm 8, pivoted at 9 to the offset 6, and extending from the passage 7 into bowl 1, carries within the bowl a circular float 10 that is disposed concentrically about the tube 2, said float-carrying arm 8 having extended therefrom at its other end a pendent valve 11, adapted to control the flow of oil to the bowl from a supply tube 12 included in the structure of offset 6.

The valve 11 has a stem and a head 13 which acts as a partial counterpoise for float 10, which latter controls the flow of oil into bowl 1 from passage 7, since the rise of the float causes valve 11 to close the outlet from tube 12. It will be noted that egress from bowl 1 is provided by pipe 14, which is in communication with said bowl at a point below the liquid level therein, said pipe serving to convey oil to a burner (not shown) for combustion. A screw cap 15 is applied to a threaded opening provided therefor in the offset 6, above the valve 11, in order that the latter may be accessible for cleansing purposes.

Extended from the offset 6 is a cylindrical extension 16 containing an oil filter, here shown in the form of a cylinder 17 of wire mesh mounted on a frame 18, said filter being concentrically disposed with respect to extension 16, in spaced relation thereto.

Oil from a source not herein shown enters the filter by means of a pipe 19 that communicates with the filter interior through an opening in the top of extension 16, and passes therefrom through a horizontal passageway 20 into a vertical passageway 21 under the control of vertically movable valve rod 22 in passageway 21. Since the bowl 1, offset 6 and extension may be comprised in a single casting, I provide an orifice 23 in the wall of extension 16, axially opposite passageway 20, to facilitate drilling the latter, said orifice being fitted with a screw stopper 24. A threaded closure member 25 is applied to the bottom of extension 16, thereby permitting access to the interior of said extension, and enabling insertion and removal of the filter. The lower end of passageway 21 opens into a horizontal passageway 26 formed through a portion 27 of the casting and connecting the lower ends of tube 12 and passageway 21, thereby enabling the filtered oil to flow, under the control of the float actuated valve 11, into bowl 1. The entrance 28 to passageway 26 is provided with a seat 29 which is adapted to co-act with the tapered valve 30 at the end of valve rod 22. A screw plug 31 is fitted in an orifice 32 in portion 27, axially aligned with passageway 26, said orifice enabling the convenient drilling of said passageway.

It is to be understood that the valve rod 22 is held normally raised, uncovering the passageway 20, as shown in full lines in Fig. 1 for the supply of oil to the float chamber or bowl 1 as required for service conditions, regulation of the oil supply being thus under the control of float 10, valve 11 automatically closing to prevent the undue rise of oil in bowl 1.

It being of great importance in the use of oil burning equipment that any possibility of overflow should be guarded against my invention includes the provision of secondary, positively acting automatic shut-off means for the oil supply, operative in the event of the oil welling up unduly in bowl 1. It is for this purpose I have provided the tube 2, which will carry off a head of oil rising above the top of said tube, the overflow of oil passing down said tube and upon a baffle 33 that is supported upon an annular shoulder 34 formed on the inner surface of receptacle 5. Openings 35 in said baffle permit the oil to pass into receptacle 5 which contains a float 36 that rises in response to the increase in liquid level. The float 36 carries a stem 37 that extends up through an orifice 38 in the baffle, through the tube 2, and thence out through an orifice 39 in the closure cap 40 for the bowl. Pivotally connected at 41 to the extended end of stem 37 is a lever 42 that is mounted on a pivot 43 carried by a yoke 44 forming part of a bracket 45 extended from the casting. Also mounted on pivot 43, between the arms of yoke 44 is a member 47, serving as a base for an upwardly extended rod 48 that is fitted thereto, said member 47 having an offset 49 lying over the top of lever 42, and carrying an adjusting screw 50 which co-acts with said lever for the purpose of regulating the attitude of rod 48. A weight 51 is carried by rod 48 near its upper end, the purpose whereof will be presently described. Also the member 47 has a yoke like extension 46 carrying a pivot 46' which engages the upper end of valve rod 22.

In the normal, inoperative position of float 36, shown in full lines in Fig. 1, the lever 42, which is connected to float stem 37, lies in an approximately horizontal position, also shown in full lines in said figure, and the member 47 is preferably so adjusted with relation to lever 42 that rod 48 is held slightly inclined from a true vertical position to overhang in a direction away from the pivotal connection 46' had by member 47 with valve rod 22. It will now be seen that the rise of float 36 due to the influx into receptacle 5 of a certain quantity of overflowing oil will have the effect of tilting lever 42 and of moving member 47, whereby valve rod 22 and valve 30 are moved toward the closed position, the dotted lines for the rod 48 and weight 51 indicated by the arrow representing the initial movement thereof over the centre, into an overbalanced position in the direction of pivot 46', in which position the weight will fall by gravity causing the valve rod to be rammed downward to forcefully press the valve 30 into positive closing engagement with its seat 29, in this manner with certainty preventing any further supply of oil from flowing into float chamber 1.

In order that the float chamber cap 40 may be removable without dismantling lever 42 and its associated elements I have formed a slot 52 through said cap, from the orifice 39 to its perimeter, said slot providing clearance means for float stem 37, whereby the cap can be slid off and on the bowl. A finger piece 53 upon the cap facilitates these operations. Also the slot is shown as provided with a closure member 54 that is pivoted at 55 to the cap and has fastening means 56.

Variations within the spirit and scope of my invention are equally comprehended by the foregoing disclosure.

I claim:

A fuel supply control device comprising a body formed en bloc with a bowl portion, a hollow off-set portion, a cylindrical extension and a connecting portion joined with the cylindrical extension and said off-set portion, said connecting portion having a passage-way communicating with the interiors of said off-set portion and said cylindrical extension, a float located in the bowl portion, a valve connected with said float and located in the off-set portion and adapted to control the portage through said passage-way, a second valve adapted to move across said passage-way, a lever pivoted upon the body and connected with the second-mentioned valve, a second float housed in the bowl and connected with said lever and a weight carried by said lever.

New York, August 8th, 1927.

LOUIS G. DE KERMOR.